United States Patent
Shimura et al.

(10) Patent No.: US 9,472,326 B2
(45) Date of Patent: Oct. 18, 2016

(54) SEMICONDUCTOR CERAMIC COMPOSITION AND PTC THERMISTOR

(71) Applicant: TDK CORPORATION, Tokyo (JP)

(72) Inventors: Yoshikazu Shimura, Tokyo (JP); Kazuhiko Itoh, Tokyo (JP); Kazutaka Fujita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/751,812

(22) Filed: Jun. 26, 2015

(65) Prior Publication Data

US 2016/0005517 A1   Jan. 7, 2016

(30) Foreign Application Priority Data

Jul. 3, 2014 (JP) .................................. 2014-137512
May 7, 2015 (JP) .................................. 2015-094758

(51) Int. Cl.
*H01C 7/02* (2006.01)
*H01C 7/00* (2006.01)
(Continued)

(52) U.S. Cl.
CPC ............. *H01C 7/025* (2013.01); *C04B 35/462* (2013.01); *C04B 35/4682* (2013.01); *H01C 1/14* (2013.01); *H01C 7/008* (2013.01); *H01C 7/02* (2013.01); *C04B 2235/3201* (2013.01); *C04B 2235/3213* (2013.01); *C04B 2235/3217* (2013.01);
(Continued)

(58) Field of Classification Search
CPC ..................................................... H01C 7/025
See application file for complete search history.

(56) References Cited

U.S. PATENT DOCUMENTS

2012/0175361 A1* 7/2012 Ino ..................... C01G 29/006
                                                    219/482
2014/0197156 A1* 7/2014 Ino ........................... H01C 7/02
                                                    219/538

(Continued)

FOREIGN PATENT DOCUMENTS

EP          1873130 A1      1/2008
JP       2009-256179 A     11/2009
(Continued)

OTHER PUBLICATIONS

Dec. 14, 2015 Extended Search Report issued in European Patent Application No. 15174796.1.

*Primary Examiner* — James Harvey
(74) *Attorney, Agent, or Firm* — Oliff PLC

(57) ABSTRACT

A semiconductor ceramic composition with small resistivity at room temperature and large temperature coefficient of resistance is provided; the composition is represented by formula, $$(Ba_{1-x-y-w}Bi_xA_yRE_w)_m(Ti_{1-z}TM_z)O_3 \quad (1),$$

(wherein, A is at least one element from Na or K, RE is at least one element from the group consisting of Y, La, Ce, Pr, Nd, Sm, Gd, Dy and Er, TM is at least one element from the group consisting of V, Nb and Ta, and w, x, y, z (each in mol) and the mole ratio m of Ba site to Ti site satisfy the following in equations, $$0.007 \leq x \leq 0.125 \quad (2)$$

$$x < y \leq 2.0x \quad (3)$$

$$0 \leq (w+z) \leq 0.010 \quad (4)$$

$$0.940 \leq m \leq 0.999 \quad (5)),$$

and further includes Sr in a proportion of 0.010 mol or more and 0.050 mol or less relative to 1 mol of Ti site, and the mole ratio u of Sr and the mole ratio x of Bi satisfy the following in equation, $$u \leq 1.8x - 0.008 \quad (6).$$

16 Claims, 1 Drawing Sheet

(51) Int. Cl.
*H01C 1/14* (2006.01)
*C04B 35/462* (2006.01)
*C04B 35/468* (2006.01)

(52) U.S. Cl.
CPC .................. *C04B2235/3224* (2013.01); *C04B 2235/3225* (2013.01); *C04B 2235/3227* (2013.01); *C04B 2235/3229* (2013.01); *C04B 2235/3239* (2013.01); *C04B 2235/3251* (2013.01); *C04B 2235/3262* (2013.01); *C04B 2235/3272* (2013.01); *C04B 2235/3281* (2013.01); *C04B 2235/3284* (2013.01); *C04B 2235/3298* (2013.01); *C04B 2235/3418* (2013.01); *C04B 2235/79* (2013.01)

(56) References Cited

U.S. PATENT DOCUMENTS

| | | | |
|---|---|---|---|
| 2015/0097650 A1* | 4/2015 | Shimura | H01C 7/025 338/22 SD |
| 2016/0005517 A1* | 1/2016 | Shimura | H01C 7/02 338/22 SD |
| 2016/0027560 A1* | 1/2016 | Itoh | H01C 7/02 338/22 R |

FOREIGN PATENT DOCUMENTS

| | | |
|---|---|---|
| JP | 2010-168265 A | 8/2010 |
| JP | 2012-004496 A | 1/2012 |
| JP | 2013-182932 A | 9/2013 |

* cited by examiner

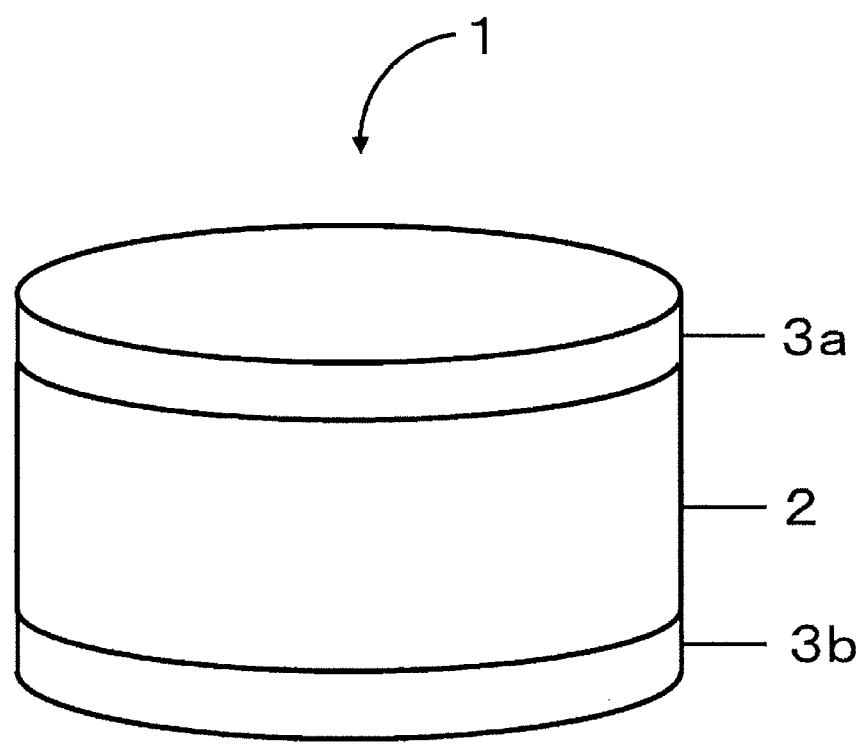

SEMICONDUCTOR CERAMIC COMPOSITION AND PTC THERMISTOR

The present invention relates to a semiconductor ceramic composition and a PTC thermistor used in a heater element or an overheat detection element which has positive temperature coefficient of resistance.

BACKGROUND

As a thermistor, a PTC (Positive Temperature Coefficient) thermistor having positive temperature coefficient of resistance has been known. Since the resistance increases as the temperature rises, the PTC thermistor can be used as a self-controlling type heating element, an over-current protecting element, an overheat detection element or the like. In the prior art, the PTC thermistor has been formed by adding a minute amount of rare earth elements or the like to barium titanate ($BaTiO_3$) which is the main component to be semiconductorized. Therefore, it will have a sharp increase in the resistance by several orders of magnitude above the Curie point, while it has a small resistance under Curie point.

The Curie point of $BaTiO_3$ is usually about 120° C. However, the Curie point can be shifted to a low temperature side by substituting a part of Ba with Sr or Sn. A high Curie point is required particularly for a PTC thermistor used as a heating element, because a PTC thermistor with high Curie point generates high temperature heat source. However, as for the shifting of the Curie point towards a high temperature side, it has been realized by substituting a part of Ba with Pb at present. From the view point of the trend of decreasing the environmental load of the world, practical application of alternative material without Pb has been demanded.

In the following Patent Document 1, a semiconductor ceramic composition without Pb has been disclosed. The composition is produced by preparing BT calcined powder consisiting of $(BaR)TiO_3$ (where R is at least one rare earth element) calcined powder or $Ba(TiM)O_3$ (where M is at least one of Nb and Sb) calcined powder, and BNT calcined powder consisiting of $(BiNa)TiO_3$ calcined powder, respectively, sintering the molded body prepared from the mixed calcined powders of the BT calcined powder and the BNT calcined powder in an atmosphere containing 1 vol % or less of oxygen, and then subjecting the sintered body to a heat-treatment for 0.5 hours or more and 24 hours or less in a temperature of 300° C. or more and 600° C. or less in an atmosphere containing 0.1 vol % or more of hydrogen.

According to the following Patent Document 1, it has been described that a semiconductor ceramic composition without using Pb, which has a Curie point shifted to a high temperature side higher than 120° C., a small resistivity at room temperature, and a lager temperature coefficient of resistance α, can be obtained.

PATENT DOCUMENT

Patent Document 1: JP2010-168265 A.

SUMMARY

In Examples of Patent Document 1, it is described that a semiconductor ceramic composition which has a small resistivity at room temperature, and a lager temperature coefficient of resistance α equal to or higher than 7%/° C. This semiconductor ceramic composition can be obtained by sintering a composition of $BaTiO_3$ with a part of Ba substituted by Bi—Na in a nitrogen atmosphere or an argon atmosphere with an oxygen concentration of less than 1 vol % during the formal sintering, and then subjecting to a heat-treatment in a hydrogen atmosphere. However, a larger temperature coefficient of resistance α as well as a resistivity at room temperature suitable for practical use is expected.

The present invention has been made in view of such actual circumstances, and aims to provide a semiconductor ceramic composition which is a $BaTiO_3$ based semiconductor ceramic composition without using Pb, and in which the Curie point is shifted to a high temperature side higher than the Curie point of 120° C. of an conventional $BaTiO_3$ at present, for example shifted to 125° C. or higher, the resistivity at room temperature is inhibited to a level suitable for practical use such as $10^3$ Ωcm or less, and the temperature coefficient of resistance α is excellent to be 30%/° C. or higher at the same time, and to provide a PTC thermistor.

The inventors of the present invention have done various studies to solve the technical problems mentioned above, and have obtained a semiconductor ceramic composition and a PTC thermistor in which the resistivity at room temperature is inhibited to a level suitable for practical use such as $10^3$ Ωcm or less, the temperature coefficient of resistance α becomes 30%/° C. or higher, and the Curie point is shifted to a high temperature side higher than 125° C. at the same time, by using a specified range of Bi and alkali metal A (Na or K) rather than Pb to substitute a part of Ba and adjusting the mole ratio of the Ba sites/Ti sites and the additive amount of Sr to a specified range in the $BaTiO_3$ based semiconductor ceramic composition.

Herein, the temperature coefficient of resistance α refers to the variance ratio of resistance relative to the increased temperature over the Curie point, and α is defined by the following equation.

$$\alpha[\%/°C.] = (\ln R_1 - \ln R_C) \times 100/(T_1 - T_C)$$

$R_1$ is the resistivity at $T_1$, $T_1$ is the temperature representing $T_{C+}20°$ C., $T_C$ is the Curie point, and Rc is the resistivity at $T_C$.

In addition, the Curie point in the present invention refers to the temperature at which the resistivity of the semiconductor ceramic composition is 2 times as compared to the resistivity at 25° C.

The inventors of the present invention believe that, as for the reason for such performance, by controlling the ratio of Bi to the alkali metal A (Na or K) in a way that A is excessive, and controlling the mole ratio of Ba site to Ti site in a way that Ti site is excessive, the appropriate grain growth is promoted, and furthermore by controlling the adding amounts of Bi and Sr in a specified range, the semiconductorization will be promoted while the Curie point will be shifted to a high temperature side. Therefore, a semiconductor ceramic composition with excellent temperature coefficient of resistance α and having a resistivity at room temperature suitable for practical use can be obtained.

That is, the present invention relates to a semiconductor ceramic composition characterized in that it comprises $BaTiO_3$ based compound represented by the following general formula (1) as the main component,

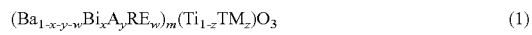

wherein, in general formula (1), A is at least one element selected from Na or K, RE is at least one element selected from the group consisting of Y, La, Ce, Pr, Nd, Sm, Gd, Dy and Er, TM is at least one element selected from the group consisting of V, Nb and Ta, and w, x, y, z (each in mole) and m (mole ratio of Ba site to Ti site) satisfy the following inequations (2) to (5).

$$0.007 \leq x \leq 0.125 \quad (2)$$

$$x < y \leq 2.0x \quad (3)$$

$$0 \leq (w+z) \leq 0.010 \quad (4)$$

$$0.940 \leq m \leq 0.999 \quad (5)$$

and the semiconductor ceramic composition further comprises Sr in a proportion of 0.010 mol or more and 0.050 mol or less in terms of element relative to 1 mol of Ti site, and the relationship between the mole ratio u of Sr and the mole ratio x of Bi satisfy the following inequation (6).

$$u \leq 1.8x - 0.008 \quad (6)$$

With Sr in the range mentioned above and added in the range satisfying the inequation (6), the semiconductorization is promoted while the Curie point can be shifted towards a high temperature side. Therefore, a small resistivity at room temperature can be obtained.

Moreover, the semiconductor ceramic composition preferably further comprises Si in a proportion of 0.035 mol or less in terms of element relative to 1 mol of Ti site. The effect of decreasing the resistivity at room temperature can be further improved by comprising Si in the range mentioned above.

In addition, the semiconductor ceramic composition preferably further comprises Mn in a proportion of 0.0015 mol or less in terms of element relative to 1 mol of Ti site. The effect of increasing the temperature coefficient of resistance α can be further improved by comprising Mn in the range mentioned above.

Moreover, the semiconductor ceramic composition preferably further comprises an additive M (at least one selected from the group consisting of Zn, Cu, Fe and Al) is in a proportion of 0.0005 mol or less in terms of element relative to 1 mol of Ti site. A secular change of the resistivity at room temperature in the constant voltage test can be improved by comprising M in the range mentioned above.

Further, in the present invention, the secular change of the resistivity at room temperature in the constant voltage test is defined as the variance ratio of resistance $\Delta \rho / \rho_0$. As the constant voltage test, a DC voltage of 20V is applied for 1000 hours, the resistivity $\rho_0$ before the test and the resistivity $\rho_1$ after the test are measured at an ambient temperature of 25° C., and the difference $\Delta \rho (=\rho_1 - \rho_0)$ is obtained to calculate the variance ratio of resistance $\Delta \rho / \rho_0$.

The resistivity at room temperature of the PTC thermistor is required to be small from the viewpoint of energy saving, but generally the resistivity at room temperature will deteriorate as time goes when the power is applied for a long term, and will tend to increase. Therefore, the variance ratio of resistance $\Delta \rho / \rho_0$ is one of the important indexes to ensure the reliability of the PTC thermistor. The tolerable range for the variance ratio of resistance $\Delta \rho / \rho_0$ in the present invention is ±20% or even narrower.

According to the present invention, a $BaTiO_3$ based semiconductor ceramic composition and a PTC thermistor which have a resistivity at room temperature as small as $10^3$ Ωcm or less, a temperature coefficient of resistance α as large as 30%/° C. or more and the Curie point shifted to a high temperature side higher than 125° C. can be obtained. The PTC thermistor of the present invention is particularly suitable for a heating element or an overheat detection element.

BRIEF DESCRIPTION OF THE DRAWINGS

FIG. 1 is a schematic prospective view showing the PTC thermistor according to one embodiment of the present invention.

DETAILED DESCRIPTION OF EMBODIMENTS

The semiconductor ceramic composition according to the present invention comprises a compound in mole ratio represented by the following formula (1) as the main component, and further comprises Sr as the minor component.

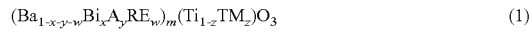

(where A is at least one element selected from Na or K, RE is at least one element selected from the group consisting of Y, La, Ce, Pr, Nd, Sm, Gd, Dy and Er, and TM is at least one element selected from the group consisting of V, Nb and Ta).

In general formula (1), w, x, y, z and m which represent the substituted amount of a part of Ba sites by Bi, A, and RE, the substituted amount of Ti sites by TM, and the ratio of Ba sites to Ti sites, respectively, satisfy the following relationships of (2)-(5), wherein the substitution of Ba sites by RE and the substitution of Ti sites by TM are arbitrary.

$$0.007 \leq x \leq 0.125 \quad (2)$$

$$x < y \leq 2.0x \quad (3)$$

$$0 \leq (w+z) \leq 0.010 \quad (4)$$

$$0.940 \leq m \leq 0.999 \quad (5)$$

Further, with respect to the semiconductor ceramic composition shown in the general formula (1), Sr is comprised in a proportion of 0.010 mol or more and 0.050 mol or less relative to 1 mol of Ti site in terms of element, and the mole ratio u of Sr and the mole ratio x of Bi satisfy the following inequation (6).

$$u \leq 1.8x - 0.008 \quad (6)$$

Further, the semiconductor ceramic composition preferably further comprises Si in a proportion of 0.035 mol or less in terms of element relative to 1 mol of Ti site. In addition, 0.005 mol or more and 0.020 mol or less is more preferred. A properly adding amount of Si functioning as the sintering agent promotes the appropriate grain growth and thus an effect of decreasing the resistivity at room temperature is achieved. However, if Si exceeds 0.035 mol, the excessive Si element will precipitate in a large amount in the grain boundaries and will prevent the movement of conduction electrons leading to the increase of the resistivity at room temperature.

In addition, the semiconductor ceramic composition preferably further comprises Mn in a proportion of 0.0015 mol or less in terms of element relative to 1 mol of Ti site. Further, 0.0005 mol or more and 0.001 mol or less is more preferred. The proper accepter level can be formed at the grain boundaries and the temperature coefficient of resistance α increases. However, if Mn exceeds 0.0015 mol, the traps of the conductor electrons will be excessive and the resistivity at room temperature will tend to increase.

In addition, the semiconductor ceramic composition preferably further comprises an additive M (at least one selected from the group consisting of Zn, Cu, Fe and Al) in a proportion of 0.005 mol or less in terms of element relative to 1 mol of Ti site. The effect of decreasing the variance ratio of resistance $\Delta\rho/\rho_0$ is achieved by comprising M in the range mentioned above. However, if the amount range of M exceeds 0.005 mol, the semiconductorization will be inadequate and the resistivity at room temperature will likely exceed $10^3$ Ωcm.

In general formula (1), the amount range x for Bi is $0.007 \leq x \leq 0.124$. If x is less than 0.007 mol, the Curie point will be not shifted towards a high temperature side. In addition, if x exceeds 0.125 mol, the semiconductorization will be inadequate and the resistivity at room temperature will exceed $10^3$ Ωcm.

In addition, in general formula (1), A is at least one element selected from Na or K, and the amount range y for A have a relation to the amount range x for Bi, which is $x<y \leq 2.0x$. When y is equal to or less than x, the semiconductorization will be inadequate and the resistivity at room temperature will exceed $10^3$ Ωcm. Moreover, if y exceeds 2.0x, the excessive A will precipitate in a large amount in the grain boundaries to prevent the movement of conduction electrons, and the resistivity at room temperature exceeds $10^3$ Ωcm.

Further, in the case where the alkali metal A is Na or K, there are some difference in the shifting amount of the Curie point towards the higher temperature side, but the resistivity at room temperature or the temperature coefficient of resistance α is almost the same.

In addition, in general formula (1) mentioned above, as for the total amount (w+z) of RE and TM which are the donor components, if it is blow 0.010 or less, there will be an effect that the resistivity at room temperature decreases, but none of them may be contained. Further, in the case of considering the respective balance between the resistivity at room temperature and temperature coefficient of resistance α, 0.001 mol or more and 0.005 mol or less is more preferred. Further, if (w+z) exceeds 0.010 mol, a part of the elements segregate in the grain boundaries to prevent the movement of conduction electrons and the resistivity at room temperature will tend to exceed $10^3$ Ωcm. More preferably, Sm, Gd and/or Er is/are selected as RE, and Nb is selected as TM. In addition, more preferably, RE (Sm, Gd, Er) and TM (Nb) are added in equal amounts for each. With the type of donor and the adding method mentioned above, the effect of decreasing the resistivity at room temperature is improved.

Further, in general formula (1) mentioned above, m (the mole ratio of Ba site to Ti site) is $0.940 \leq m \leq 0.999$. If m is less than 0.940, the semiconductorization will be inadequate, and the resistivity at room temperature will exceed $10^3$ Ωcm. In addition, if m exceeds 0.999 mol, the sintered density will decrease and the resistivity at room temperature will exceed $10^3$ Ωcm. More preferably, with the range of $0.950 \leq m \leq 0.960$, the resistivity at room temperature will be further decreased.

Moreover, with respect to general formula (1) mentioned above, the amount range of Sr, which is added as an minor component, is 0.010 mol or more and 0.050 mol or less. When the amount range of Sr is less than 0.010 mol, the semiconductorization will be inadequate and the resistivity at room temperature will exceed $10^3$ Ωcm. In addition, if the amount range of Sr exceeds 0.050 mol, the sintered density will decrease and the resistivity at room temperature will exceed $10^3$ Ωcm. Preferably, with the range of 0.030 mol or more and 0.040 mol or less, the resistivity at room temperature can be further decreased. Further, inequation (6) represents the relationship between the mole ratio u of Sr and the mole ratio x of Bi. If Sr is added in an amount exceeding 1.8x−0.008, the Curie point will be lower than 125° C.

Further, with respect to the general formula (1) mentioned above, the amount range of M (at least one selected from the group consisting of Zn, Cu, Fe and Al), which is added as an minor component, is in an preferable range of 0.005 mol or less relative to 1 mol of Ti site. An effect of decreasing the variance ratio of resistance $\Delta\rho/\rho_0$ is achieved by comprising M in the range mentioned above. However, if the amount range of M exceeds 0.005 mol, the semiconductorization will be inadequate and the resistivity at room temperature will exceed $10^3$ Ωcm.

FIG. 1 is a prospective view showing the schematic structure of the PTC thermistor that is formed by using the $BaTiO_3$ based semiconductor ceramic composition mentioned above as one embodiment of the invention.

As shown in FIG. 1, the PTC thermistor 1 comprises a ceramic body 2 which is composed of the $BaTiO_3$ based semiconductor ceramic composition of the present invention, and electrodes 3a and 3b which are formed on two opposing main surfaces of the ceramic body. The electrodes 3a and 3b are formed by a single layer structure or multiple-layer structure composed of conductive materials such as Cu, Ni, Al, Cr, Zn, Ag, Ni—Cr alloy, Ni—Cu or the like. In addition, the shape of the PTC thermistor 1 shown in FIG. 1 is round and may be rectangular. Also, a stacked structure that has multiple electrodes inside the ceramic body is possible.

The semiconductor ceramic composition of the present invention is obtained by mixing and calcining the compound comprising various elements that constitute formula (1) mentioned above, pulverizing the calcined powder, adding a binder to be granulated and molded, and then performing the debindering and the sintering. The sintering process can be performed in either an air atmosphere or a nitrogen atmosphere. However, since it is necessary to further perform a thermal treatment at 800 to 1000° C. in an oxidative atmosphere in the case where the sintering is performed in the nitrogen atmosphere, the sintering performed in air atmosphere is preferred from the viewpoint of simple process. Similarly, the sintering performed in air atmosphere is also preferred from the viewpoint of decreasing cost.

EXAMPLES

Hereinafter, the present invention will be described in details based on Examples and Comparative Examples, but the present invention will not be limited to these Examples.

Example 1 (Sample No. 1 to 70) and Comparative Examples 1 to 34

Raw material powders of $BaCO_3$, $TiO_2$, $Bi_2O_3$, $Na_2CO_3$, $K_2CO_3$, $SrCO_3$, $SiO_2$, $MnCO_3$, ZnO, CuO, $Fe_2O_3$, $Al_2O_3$, the oxide of RE (for example, $Y_2O_3$), the oxide of TM (for example, $Nb_2O_5$) were prepared, and all the materials were weighed in a way that the composition after sintering would be as shown in Table 1-8. After mixing in acetone with a ball mill, the mixture was dried and calcined for 2 hours at 900° C.

The calcined body was pulverized in pure water using a ball mill, and after that dehydration and drying were carried out. Then it was granulated using binders such as PVA and the like to obtain granulated powder. The granulated powder was molded into a cylindrical shape (diameter of 17 mm×thickness of 1.0 mm) with a uniaxial press machine, and then sintered in air atmosphere for 2 hours at 1200° C. to obtain a sintered body.

Ag—Zn paste was coated by screen printing on the two surfaces of the sintered body and then baked in air atmosphere at 500-700° C. Then the measuring of the resistivity over temperature was carried out from 25° C. to 280° C. The results of example 1 of the present invention was shown in tables 1-7

Example 2

A PTC thermistor was prepared in the same way as Example 1, except that the atmosphere in the process of sintering was set to be nitrogen atmosphere, and the heat-treatment was carried out in air atmosphere at 800° C. And the evaluation was carried out in the same way as Example 1. The results of Example 2 of the present invention were shown in table 8.

From table 1, it could be known that there was a relationship between the amount range x of Bi and the Curie point. From samples No. 1-10, it could be known that when the amount range of Bi was 0.007≤x≤0.125, the Curie point will be shifted to the high temperature side higher than 120° C., which is the Curie point of $BaTiO_3$, and the resistivity at room temperature was $10^3$ Ωcm or less. In addition, it could be known that the more the amount of x was, the higher temperature side the Curie point shifted towards, and the resistivity at room temperature tended to increase slightly. In the comparative example 1 and example 3 in which the amount range of the Bi element was less than 0.007, the resistivity at room temperature was small, but the Curie point did not shift to the higher temperature side higher than 120° C. Moreover, it could be known that in the comparative example 2 and example 4 in which the amount range of the A element exceeded 0.125, the resistivity at room temperature was far more than $10^3$ Ωcm. In addition, in the case where A is Na or K, there are some difference in the shifting amount of the Curie point towards the higher temperature side, but the resistivity at room temperature or the variance of temperature coefficient of resistance α is almost the same.

TABLE 1

| Sample No. | x [mol] | y [mol] | m | Sr [mol] | M [mol] | w + z [mol] | Si [mol] | Mn [mol] | resistivity at room temperature [Ωcm] | Curie point [° C.] | A Na or K | temperature coefficient of resistance α [%/° C.] | Note |
|---|---|---|---|---|---|---|---|---|---|---|---|---|---|
| Comparative Example 1 | 0.005 | 0.010 | 0.999 | 0.010 | 0 | 0 | 0 | 0 | 400 | 120 | Na | 27 | Curie point x |
| 1 | 0.010 | 0.020 | | | | | | | 450 | 125 | | 30 | |
| 2 | 0.030 | 0.060 | | | | | | | 600 | 140 | | 33 | |
| 3 | 0.050 | 0.100 | | | | | | | 700 | 160 | | 33 | |
| 4 | 0.100 | 0.200 | | | | | | | 850 | 190 | | 35 | |
| 5 | 0.125 | 0.250 | | | | | | | 850 | 220 | | 33 | |
| Comparative Example 2 | 0.130 | 0.260 | | | | | | | 1.5E+06 | — | | — | resistivity at room temperature x |
| Comparative Example 3 | 0.005 | 0.010 | 0.999 | 0.010 | 0 | 0 | 0 | 0 | 400 | 120 | K | 25 | Curie point x |
| 6 | 0.010 | 0.020 | | | | | | | 500 | 125 | | 35 | |
| 7 | 0.030 | 0.060 | | | | | | | 650 | 150 | | 35 | |
| 8 | 0.050 | 0.100 | | | | | | | 700 | 180 | | 36 | |
| 9 | 0.100 | 0.200 | | | | | | | 850 | 220 | | 38 | |
| 10 | 0.125 | 0.250 | | | | | | | 850 | 240 | | 36 | |
| Comparative Example 4 | 0.130 | 0.260 | | | | | | | 1.5E+06 | — | | — | resistivity at room temperature x |

It could be known from Table 2 that, the amount range y of A was related to the amount range x of Bi. In addition, A was at least one element selected from Na or K. According to Sample No. 1, 3, 5 and 11-16, if the amount range y was x<y≤2.0x, the resistivity at room temperature would be small and the temperature coefficient of resistance α could be maintained to be 30%/° C. or more. If x was fixed, the resistivity at room temperature would tend to decrease slightly with the increase of y. In addition, in Comparative Examples 5, 6, 8, 9, 11 and 12 in which the amount range of y was equal to or less than x, the resistivity at room temperature was small, but the temperature coefficient of resistance α was less than 30%/° C. Also, in Comparative Examples 7, 10 and 13 in which the amount range of y exceeded 2.0x, the resistivity at room temperature increased and exceeded $10^3$ Ωcm.

TABLE 2

| Sample No. | x [mol] | y [mol] | m | Sr [mol] | M [mol] | w + z [mol] | Si [mol] | Mn [mol] | resistivity at room temperature [Ωcm] | Curie point [° C.] | A Na or K | temperature coefficient of resistance α[%/° C.] | Note |
|---|---|---|---|---|---|---|---|---|---|---|---|---|---|
| Comparative Example 5 | 0.010 | 0.008 | 0.999 | 0.010 | 0 | 0 | 0 | 0 | 1000 | 125 | Na | 20 | temperature coefficient of resistance α x |
| Comparative Example 6 | | 0.010 | | | | | | | 850 | | | 25 | temperature coefficient of resistance α x |

TABLE 2-continued

| Sample No. | x [mol] | y [mol] | m | Sr [mol] | M [mol] | w + z [mol] | Si [mol] | Mn [mol] | resistivity at room temperature [Ωcm] | Curie point [° C.] | A Na or K | temperature coefficient of resistance α[%/° C.] | Note |
|---|---|---|---|---|---|---|---|---|---|---|---|---|---|
| 11 | | 0.013 | | | | | | | 700 | | | 30 | |
| 12 | | 0.015 | | | | | | | 500 | | | 30 | |
| 1 | | 0.020 | | | | | | | 450 | | | 30 | |
| Comparative Example 7 | | 0.023 | | | | | | | 1.0E+05 | | | — | resistivity at room temperature x |
| Comparative Example 8 | 0.050 | 0.040 | 0.999 | 0.010 | 0 | 0 | 0 | 0 | 900 | 160 | Na | 15 | temperature coefficient of resistance α x |
| Comparative Example 9 | | 0.050 | | | | | | | 900 | | | 27 | temperature coefficient of resistance α x |
| 13 | | 0.063 | | | | | | | 900 | | | 32 | |
| 14 | | 0.075 | | | | | | | 750 | | | 33 | |
| 3 | | 0.100 | | | | | | | 700 | | | 33 | |
| Comparative Example 10 | | 0.113 | | | | | | | 1.00E+04 | | | — | resistivity at room temperature x |
| Comparative Example 11 | 0.125 | 0.100 | 0.999 | 0.010 | 0 | 0 | 0 | 0 | 1000 | 220 | Na | 16 | temperature coefficient of resistance α x |
| Comparative Example 12 | | 0.125 | | | | | | | 950 | | | 26 | temperature coefficient of resistance α x |
| 15 | | 0.156 | | | | | | | 900 | | | 33 | |
| 16 | | 0.188 | | | | | | | 900 | | | 34 | |
| 5 | | 0.250 | | | | | | | 850 | | | 33 | |
| Comparative Example 13 | | 0.281 | | | | | | | 1.0E+05 | | | — | resistivity at room temperature x |

From Table 3, it could be known that, the mole ratio m of Ba site/Ti site was related to the resistivity at room temperature. And it was known that in Sample No. 5, 17 and 18 in which the range of m was 0.940≤m≤0.999, the resistivity at room temperature was small and the temperature coefficient of resistance α shifted to 30%/° C. or more. In addition, the resistivity at room temperature and the temperature coefficient of resistance α tended to increase slightly with the increase of m. In Comparative Example 14 in which m was less than 0.940 mol, the resistivity at room temperature exceeded $10^3$ Ωcm and the temperature coefficient of resistance α was smaller. Further, in Comparative Example 15 in which m exceeded 0.999 mol, the resistivity at room temperature exceeded $10^3$ Ωcm and the semiconductorization was inadequate.

cient of resistance α was maintained to be 30%/° C. or more. In addition, the resistivity at room temperature tended to increase slightly with the increase of the amount of Sr. As for Comparative Examples 16 and 20 in which the amount of Sr was less than 0.010 mol and Comparative Examples 19 and 21 in which the amount of Sr was more than 0.050 mol, it could be known that the resistivity at room temperature increased and exceed $10^3$ Ωcm. Preferably, with the range of 0.030 mol or more and 0.040 mol or less, the resistivity at room temperature could be further decreased. In addition, the mole ratio u of Sr was related to the mole ratio x of Bi as shown in the inequation (6). If Sr was added in an amount

TABLE 3

| Sample No. | x [mol] | y [mol] | m | Sr [mol] | M [mol] | w + z [mol] | Si [mol] | Mn [mol] | resistivity at room temperature [Ωcm] | Curie point [° C.] | A Na or K | temperature coefficient of resistance α[%/° C.] | Note |
|---|---|---|---|---|---|---|---|---|---|---|---|---|---|
| Comparative Example 14 | 0.125 | 0.250 | 0.920 | 0.010 | 0 | 0 | 0 | 0 | 5.E+03 | 220 | Na | 2 | temperature coefficient of resistance α x |
| 17 | | | 0.940 | | | | | | 450 | | | 30 | |
| 18 | | | 0.970 | | | | | | 500 | | | 31 | |
| 5 | | | 0.999 | | | | | | 850 | | | 33 | |
| Comparative Example 15 | | | 1.020 | | | | | | 1.E+05 | | | — | temperature coefficient of resistance α x |

From Table 4, it could be known that the amount range of minor component Sr was related to the Curie point. In Sample No. 1 and 19 to 21 in which the amount range of Sr is 0.010 mol or more and 0.050 mol or less, the resistivity at room temperature was small and the temperature coeffiexceeding 1.8x-0.008, the Curie point would be less than 125° C., and thus it was not preferable. In Comparative Examples 17 and 18 in which Sr was added in an amount exceeding 1.8x-0.008, it could be known the Curie point was less than 125° C.

TABLE 4

| Sample No. | x [mol] | y [mol] | m | Sr [mol] | M [mol] | w + z [mol] | Si [mol] | Mn [mol] | resistivity at room temperature [Ωcm] | Curie point [° C.] | A Na or K | temperature coefficient of resistance α[%/° C.] | Note |
|---|---|---|---|---|---|---|---|---|---|---|---|---|---|
| Comparative Example 16 | 0.010 | 0.020 | 0.999 | 0.005 | 0 | 0 | 0 | 0 | 5.0E+04 | — | Na | — | temperature coefficient of resistance α x |
| 1 | | | | 0.010 | | | | | 850 | 125 | | 30 | |
| Comparative Example 17 | | | | 0.030 | | | | | 650 | 110 | | 35 | Curie point x |
| Comparative Example 18 | | | | 0.050 | | | | | 850 | 90 | | 35 | Curie point x |
| Comparative Example 19 | | | | 0.055 | | | | | 5.0E+03 | 85 | | — | resistivity at room temperature x |
| Comparative Example 20 | 0.035 | 0.070 | 0.999 | 0.005 | 0 | 0 | 0 | 0 | 5.0E+04 | — | Na | — | temperature coefficient of resistance α x |
| 19 | | | | 0.010 | | | | | 850 | 220 | | 33 | |
| 20 | | | | 0.030 | | | | | 650 | 170 | | 35 | |
| 21 | | | | 0.050 | | | | | 850 | 135 | | 33 | |
| Comparative Example 21 | | | | 0.055 | | | | | 5.5E+03 | 120 | | — | Curie point x |

It could be known from Sample No. 5 and 22-24 in Table 5 that, if the amount range of the minor component Si was 0.035 mol or less, an effect of decreasing the resistivity at room temperature could be achieved.

TABLE 5

| Sample No. | x [mol] | y [mol] | m | Sr [mol] | M [mol] | w + z [mol] | Si [mol] | Mn [mol] | resistivity at room temperature [Ωcm] | Curie point [° C.] | A Na or K | temperature coefficient of resistance α[%/° C.] | Note |
|---|---|---|---|---|---|---|---|---|---|---|---|---|---|
| 5 | 0.125 | 0.250 | 0.999 | 0.010 | 0 | 0 | 0.000 | 0 | 850 | 220 | Na | 33 | |
| 22 | | | | | | | 0.005 | | 700 | | | 33 | |
| 23 | | | | | | | 0.020 | | 600 | | | 33 | |
| 24 | | | | | | | 0.035 | | 500 | | | 34 | |
| Comparative Example 22 | | | | | | | 0.040 | | 2000 | | | 34 | resistivity at room temperature x |

It could be known from Sample No. 5 and 25 to 28 in Table 6 that, if the amount range of M was 0.0015 mol or less, the temperature coefficient of resistance α increased. In addition, if both of the resistivity at room temperature and the temperature coefficient of resistance α were considered, 0.0005 mol or more and 0.001 mol or less was more preferred.

From Sample No. 5 and 29 to 70 in Table 7, it could be known that, if the total amount (w+z) of RE and TM was 0.010 or less, an effect of decreasing the resistivity at room temperature could be achieved. In addition, if the respective balances of the resistivity at room temperature and the temperature coefficient of resistance α were considered, 0.001 mol or more and 0.005 mol or less was more preferred.

TABLE 6

| Sample No. | x [mol] | y [mol] | m | Sr [mol] | M [mol] | w + z [mol] | Si [mol] | Mn [mol] | resistivity at room temperature [Ωcm] | Curie point [° C.] | A Na or K | temperature coefficient of resistance α[%/° C.] | Note |
|---|---|---|---|---|---|---|---|---|---|---|---|---|---|
| 5 | 0.125 | 0.250 | 0.999 | 0.010 | 0 | 0 | 0 | 0 | 850 | 220 | Na | 33 | |
| 25 | | | | | | | | 0.0005 | 750 | | | 40 | |
| 26 | | | | | | | | 0.00075 | 700 | | | 38 | |
| 27 | | | | | | | | 0.001 | 700 | | | 40 | |
| 28 | | | | | | | | 0.0015 | 800 | | | 35 | |
| Comparative Example 23 | | | | | | | | 0.002 | 2000 | | | 36 | resistivity at room temperature x |

Further, when Re was Sm, Gd or Er and TM was Nb, it could be known that the resistivity at room temperature was less than that of the other RE and TM. Also, as for Comparative Examples 24 to 36 in which (w+z) exceeded 0.010, it could be known that the resistivity at room temperature exceeded $10^3$ Ωcm. Further, it could be known from Sample No. 65-70 that the resistivity at room temperature was also smaller when RE and TM were added in an equal amount for each even if the values of (w+z) was the same.

TABLE 7

| Sample No. | X [mol] | Y [mol] | m | Sr [mol] | M [mol] | Si [mol] | Mn [mol] | RE | TM | W [mol] | Z [mol] | resistivity at room temperature [Ωcm] | Curie point [° C.] | A Na or K | temperature coefficient of resistance α[%/° C.] | Note |
|---|---|---|---|---|---|---|---|---|---|---|---|---|---|---|---|---|
| 5 | 0.125 | 0.250 | 0.999 | 0.010 | 0 | 0 | 0 | Y | | 0.000 | 0.000 | 850 | 220 | Na | 33 | |
| 29 | | | | | | | | | | 0.001 | 0.000 | 700 | | | 34 | |
| 30 | | | | | | | | | | 0.005 | 0.000 | 600 | | | 34 | |
| 31 | | | | | | | | | | 0.010 | 0.000 | 650 | | | 34 | |
| Comparative Example 24 | | | | | | | | | | 0.012 | 0.000 | 4800 | | | 11 | resistivity at room temperature x |
| 32 | 0.125 | 0.250 | 0.999 | 0.010 | 0 | 0 | 0 | La | | 0.001 | 0.000 | 700 | 220 | Na | 31 | |
| 33 | | | | | | | | | | 0.005 | 0.000 | 600 | | | 31 | |
| 34 | | | | | | | | | | 0.010 | 0.000 | 650 | | | 31 | |
| Comparative Example 25 | | | | | | | | | | 0.012 | 0.000 | 8000 | | | 8 | resistivity at room temperature x |
| 35 | 0.125 | 0.250 | 0.999 | 0.010 | 0 | 0 | 0 | Ce | | 0.001 | 0.000 | 700 | 220 | Na | 30 | |
| 36 | | | | | | | | | | 0.005 | 0.000 | 650 | | | 30 | |
| 37 | | | | | | | | | | 0.010 | 0.000 | 700 | | | 30 | |
| Comparative Example 26 | | | | | | | | | | 0.012 | 0.000 | 7000 | | | 10 | resistivity at room temperature x |
| 38 | 0.125 | 0.250 | 0.999 | 0.010 | 0 | 0 | 0 | Pr | | 0.001 | 0.000 | 750 | 220 | Na | 30 | |
| 39 | | | | | | | | | | 0.005 | 0.000 | 650 | | | 30 | |
| 40 | | | | | | | | | | 0.010 | 0.000 | 700 | | | 31 | |
| Comparative Example 27 | | | | | | | | | | 0.012 | 0.000 | 4000 | | | 12 | resistivity at room temperature x |
| 41 | 0.125 | 0.250 | 0.999 | 0.010 | 0 | 0 | 0 | Nd | | 0.001 | 0.000 | 700 | 220 | Na | 30 | |
| 42 | | | | | | | | | | 0.005 | 0.000 | 650 | | | 30 | |
| 43 | | | | | | | | | | 0.010 | 0.000 | 700 | | | 30 | |
| Comparative Example 28 | | | | | | | | | | 0.012 | 0.000 | 7000 | | | 8 | resistivity at room temperature x |
| 44 | 0.125 | 0.250 | 0.999 | 0.010 | 0 | 0 | 0 | Sm | | 0.001 | 0.000 | 500 | 220 | Na | 30 | |
| 45 | | | | | | | | | | 0.005 | 0.000 | 550 | | | 30 | |
| 46 | | | | | | | | | | 0.010 | 0.000 | 700 | | | 30 | |
| Comparative Example 29 | | | | | | | | | | 0.012 | 0.000 | 5000 | | | 12 | resistivity at room temperature x |
| 47 | 0.125 | 0.250 | 0.999 | 0.010 | 0 | 0 | 0 | Gd | | 0.001 | 0.000 | 600 | 220 | Na | 30 | |
| 48 | | | | | | | | | | 0.005 | 0.000 | 550 | | | 30 | |
| 49 | | | | | | | | | | 0.010 | 0.000 | 650 | | | 31 | |
| Comparative Example 30 | | | | | | | | | | 0.012 | 0.000 | 3000 | | | 14 | resistivity at room temperature x |
| 50 | 0.125 | 0.250 | 0.999 | 0.010 | 0 | 0 | 0 | Dy | | 0.001 | 0.000 | 700 | 220 | Na | 30 | |
| 51 | | | | | | | | | | 0.005 | 0.000 | 600 | | | 32 | |
| 52 | | | | | | | | | | 0.010 | 0.000 | 650 | | | 32 | |
| Comparative Example 31 | | | | | | | | | | 0.012 | 0.000 | 4000 | | | 12 | resistivity at room temperature x |
| 53 | 0.125 | 0.250 | 0.999 | 0.010 | 0 | 0 | 0 | Er | | 0.001 | 0.000 | 550 | 220 | Na | 32 | |
| 54 | | | | | | | | | | 0.005 | 0.000 | 550 | | | 30 | |
| 55 | | | | | | | | | | 0.010 | 0.000 | 600 | | | 30 | |

TABLE 7-continued

| Sample No. | X [mol] | Y [mol] | m | Sr [mol] | M [mol] | Si [mol] | Mn [mol] | RE | TM | W [mol] | Z [mol] | resistivity at room temperature [Ωcm] | Curie point [° C.] | A Na or K | temperature coefficient of resistance α[%/° C.] | Note |
|---|---|---|---|---|---|---|---|---|---|---|---|---|---|---|---|---|
| Comparative Example 32 | | | | | | | | | | 0.012 | 0.000 | 5500 | | | 9 | resistivity at room temperature x |
| 56 | 0.125 | 0.250 | 0.999 | 0.010 | 0 | 0 | 0 | | V | 0.000 | 0.001 | 700 | 220 | Na | 30 | |
| 57 | | | | | | | | | | 0.000 | 0.005 | 700 | | | 30 | |
| 58 | | | | | | | | | | 0.000 | 0.010 | 700 | | | 30 | |
| Comparative Example 33 | | | | | | | | | | 0.000 | 0.012 | 12000 | | | 8 | resistivity at room temperature x |
| 59 | 0.125 | 0.250 | 0.999 | 0.010 | 0 | 0 | 0 | | Nb | 0.000 | 0.001 | 500 | 220 | Na | 33 | |
| 60 | | | | | | | | | | 0.000 | 0.005 | 550 | | | 33 | |
| 61 | | | | | | | | | | 0.000 | 0.010 | 700 | | | 32 | |
| Comparative Example 34 | | | | | | | | | | 0.000 | 0.012 | 4000 | | | 10 | resistivity at room temperature x |
| 62 | 0.125 | 0.250 | 0.999 | 0.010 | 0 | 0 | 0 | | Ta | 0.000 | 0.001 | 700 | 220 | Na | 30 | |
| 63 | | | | | | | | | | 0.000 | 0.005 | 600 | | | 30 | |
| 64 | | | | | | | | | | 0.000 | 0.010 | 700 | | | 32 | |
| Comparative Example 35 | | | | | | | | | | 0.000 | 0.012 | 7000 | | | 9 | resistivity at room temperature x |
| 65 | 0.125 | 0.250 | 0.999 | 0.010 | 0 | 0 | 0 | Gd | Nb | 0.0025 | 0.0025 | 400 | 220 | Na | 33 | |
| 66 | | | | | | | | | | 0.001 | 0.004 | 600 | | | 30 | |
| 67 | | | | | | | | | | 0.004 | 0.001 | 600 | | | 33 | |
| 68 | | | | | | | | | | 0.005 | 0.005 | 450 | | | 32 | |
| 69 | | | | | | | | | | 0.002 | 0.008 | 700 | | | 30 | |
| 70 | | | | | | | | | | 0.008 | 0.002 | 700 | | | 30 | |
| Comparative Example 36 | | | | | | | | | | 0.006 | 0.006 | 11000 | | | 8 | resistivity at room temperature x |

It was known from Table 8 that if the amount range of the minor component M (at least one from the group consisting of Zn, Cu, Fe and Al) was 0.005 mol or less, an effect of decreasing the variance ratio of resistance $\Delta\rho/\rho_0$ could be achieved. In Sample No. 72 to 83 in which the amount range of M was 0.005 mol or less, It was known that the variance ratio of resistance $\Delta\rho/\rho_0$ was maintained to be 20% or less even when any of Zn, Cu, Fe and Al was added. However, if the amount range of M exceeded 0.005 mol, the resistivity at room temperature was likely to increase. Also, if the adding amount of M was within the specified range, the same effect could be obtained even by using multiple raw materials such as Zn and Cu, for example.

TABLE 8

| Sample No. | x [mol] | y [mol] | m | Sr [mol] | M | M [mol] | w + z [mol] | Si [mol] | Mn [mol] | A Na or K | variance ratio of resistance Δρ/ρ0 [%] |
|---|---|---|---|---|---|---|---|---|---|---|---|
| 71 | 0.125 | 0.2 | 0.999 | 0.01 | — | 0 | 0 | 0 | 0 | Na | 20 |
| 72 | 0.125 | 0.2 | 0.999 | 0.01 | Zn | 0.0005 | 0 | 0 | 0 | Na | 18 |
| 73 | | | | | | 0.001 | | | | Na | 16 |
| 74 | | | | | | 0.005 | | | | Na | 16 |
| 75 | 0.125 | 0.2 | 0.999 | 0.01 | Cu | 0.0005 | 0 | 0 | 0 | Na | 18 |
| 76 | | | | | | 0.001 | | | | Na | 16 |
| 77 | | | | | | 0.005 | | | | Na | 17 |
| 78 | 0.125 | 0.2 | 0.999 | 0.01 | Fe | 0.0005 | 0 | 0 | 0 | Na | 18 |
| 79 | | | | | | 0.001 | | | | Na | 16 |
| 80 | | | | | | 0.005 | | | | Na | 17 |
| 81 | 0.125 | 0.2 | 0.999 | 0.01 | Al | 0.0005 | 0 | 0 | 0 | Na | 17 |
| 82 | | | | | | 0.001 | | | | Na | 15 |
| 83 | | | | | | 0.005 | | | | Na | 14 |

It could be known from Sample No. 5 and 84 in Table 9 that, when the atmosphere during sintering was a nitrogen atmosphere ($PO_2=10^{-7}$ atm), almost the same properties as that in the case of sintering in air atmosphere could be obtained.

TABLE 9

| Sample No. | atmosphere during sintering process | x [mol] | y [mol] | m | Sr [mol] | M [mol] | w + z [mol] | Si [mol] | Mn [mol] | resistivity at room temperature [Ωcm] | Curie point [° C.] | A Na or K | temperature coefficient of resistance α[%/° C.] |
|---|---|---|---|---|---|---|---|---|---|---|---|---|---|
| 5 | in air | 0.125 | 0.250 | 0.999 | 0.010 | 0 | 0 | 0 | 0 | 850 | 220 | Na | 33 |
| 84 | in nitrogen | | | | | | | | | 650 | | | 30 |

DESCRIPTION OF REFERENCE NUMERALS

1 PTC thermistor
2 ceramic body
3a, 3b electrodes

What is claimed is:

1. A semiconductor ceramic composition represented by the following general formula (1), $$(Ba_{1-x-y-w}Bi_xA_yRE_w)_m(Ti_{1-z}TM_z)O_3 \quad (1),$$

wherein, in the general formula (1),
A is at least one element selected from Na or K,
RE is at least one element selected from the group consisting of Y, La, Ce, Pr, Nd, Sm, Gd, Dy and Er,
TM is at least one element selected from the group consisting of V, Nb and Ta,
w, x, y, z (each in mol) and m (the mole ratio of Ba site to Ti site) satisfy the following in equations (2) to (5), $$0.007 \leq x \leq 0.125 \quad (2)$$

$$x < y \leq 2.0x \quad (3)$$

$$0 \leq (w+z) \leq 0.010 \quad (4)$$

$$0.940 \leq m \leq 0.999 \quad (5),$$

and Sr is further contained in a proportion of 0.010 mol or more and 0.050 mol or less relative to 1 mol of Ti site in terms of element, and the mole ratio u of Sr and the mole ratio x of Bi satisfy the following in equation (6), $$u \leq 1.8x - 0.008 \quad (6).$$

2. The semiconductor ceramic composition of claim 1, further comprising Si in a proportion of 0.035 mol or less in terms of element relative to 1 mol of Ti site.

3. The semiconductor ceramic composition of claim 1, further comprising Mn in a proportion of 0.0015 mol or less in terms of element relative to 1 mol of Ti site.

4. The semiconductor ceramic composition of claim 1, further comprising an additive M (at least one selected from the group consisting of Zn, Cu, Fe and Al) in a proportion of 0.005 mol or less in terms of element relative to 1 mol of Ti site.

5. A PTC thermistor, comprising:
a ceramic body that is formed by using the semiconductor ceramic composition of claim 1, and
electrodes that are formed on the surfaces of the ceramic body.

6. The semiconductor ceramic composition of claim 2, further comprising Mn in a proportion of 0.0015 mol or less in terms of element relative to 1 mol of Ti site.

7. The semiconductor ceramic composition of claim 2, further comprising an additive M (at least one selected from the group consisting of Zn, Cu, Fe and Al) in a proportion of 0.005 mol or less in terms of element relative to 1 mol of Ti site.

8. The semiconductor ceramic composition of claim 3, further comprising an additive M (at least one selected from the group consisting of Zn, Cu, Fe and Al) in a proportion of 0.005 mol or less in terms of element relative to 1 mol of Ti site.

9. The semiconductor ceramic composition of claim 6, further comprising an additive M (at least one selected from the group consisting of Zn, Cu, Fe and Al) in a proportion of 0.005 mol or less in terms of element relative to 1 mol of Ti site.

10. A PTC thermistor, comprising:
a ceramic body that is formed by using the semiconductor ceramic composition of claim 2, and
electrodes that are formed on the surfaces of the ceramic body.

11. A PTC thermistor, comprising:
a ceramic body that is formed by using the semiconductor ceramic composition of claim 3, and
electrodes that are formed on the surfaces of the ceramic body.

12. A PTC thermistor, comprising:
a ceramic body that is formed by using the semiconductor ceramic composition of claim 4, and
electrodes that are formed on the surfaces of the ceramic body.

13. A PTC thermistor, comprising:
a ceramic body that is formed by using the semiconductor ceramic composition of claim 6, and
electrodes that are formed on the surfaces of the ceramic body.

14. A PTC thermistor, comprising:
a ceramic body that is formed by using the semiconductor ceramic composition of claim 7, and
electrodes that are formed on the surfaces of the ceramic body.

15. A PTC thermistor, comprising:
a ceramic body that is formed by using the semiconductor ceramic composition of claim 8, and
electrodes that are formed on the surfaces of the ceramic body.

16. A PTC thermistor, comprising:
a ceramic body that is formed by using the semiconductor ceramic composition of claim 9, and
electrodes that are formed on the surfaces of the ceramic body.

* * * * *